United States Patent Office 2,780,011
Patented Feb. 5, 1957

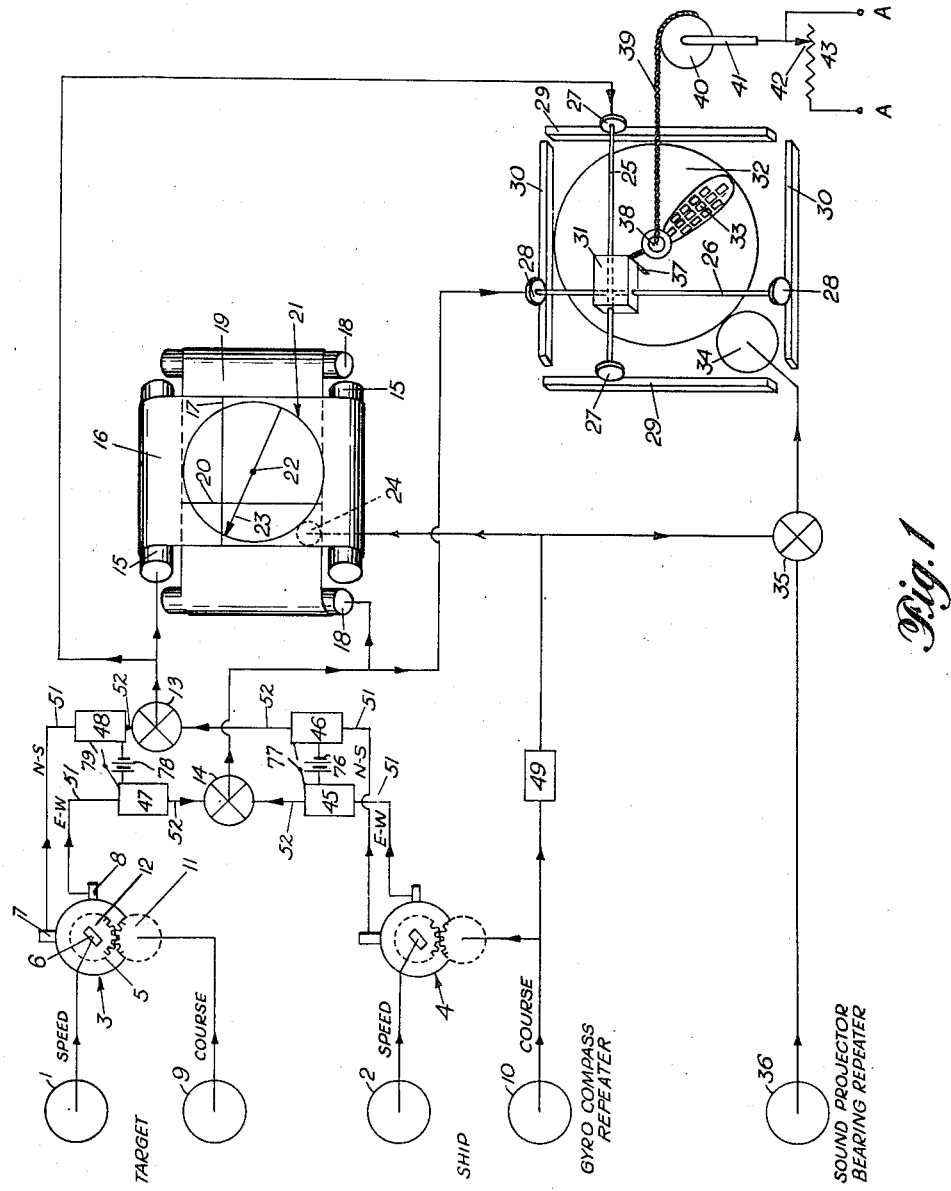

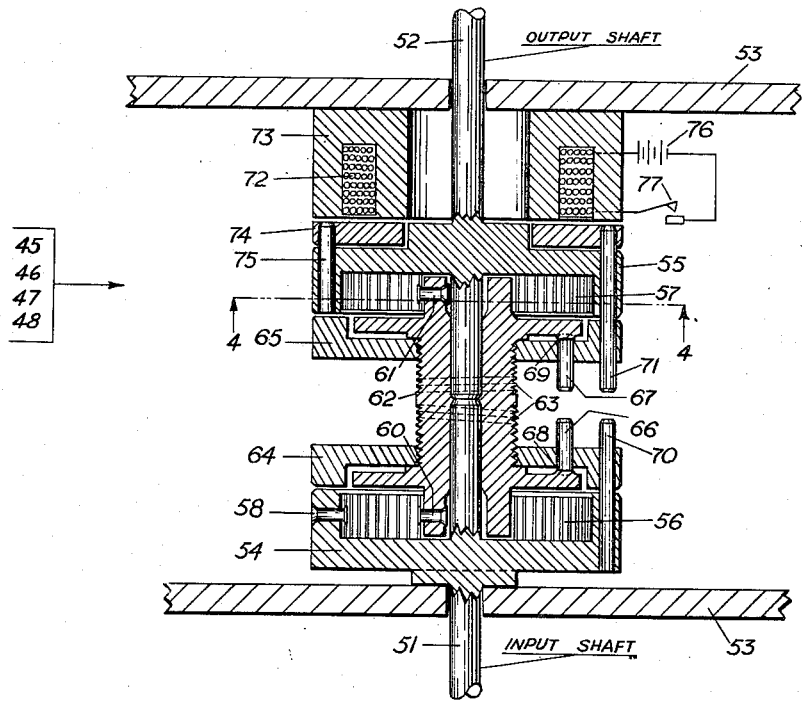
Fig. 3
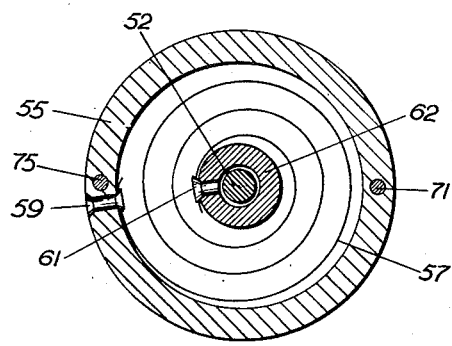
Fig. 4
Fig. 2
Inventor
Firth Pierce
and George A. Brettell Jr.
By
F. E. Bush
Attorney

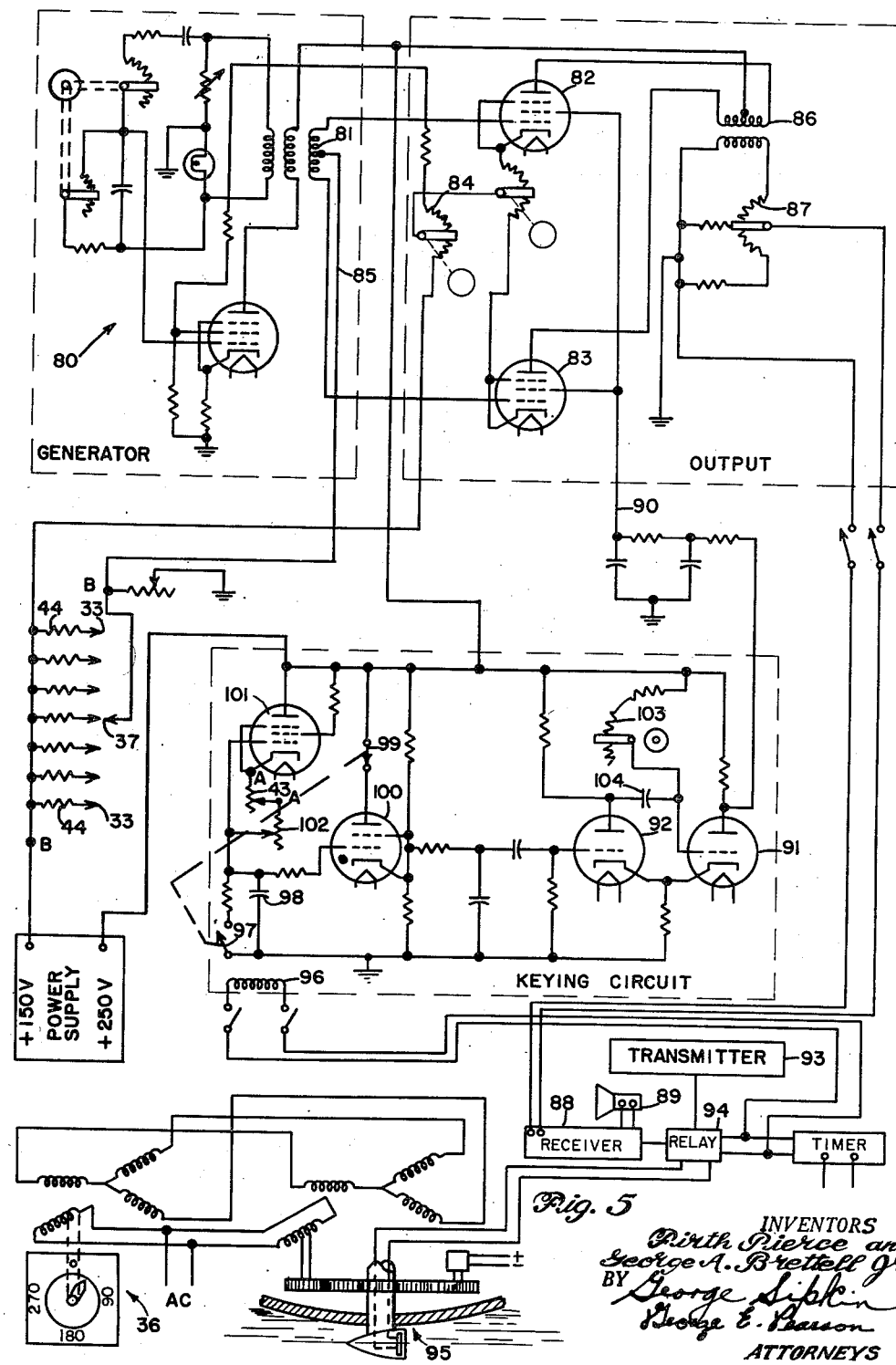

2,780,011

SHIPBOARD TRAINING DEVICE

Firth Pierce and George A. Brettell, Jr., La Jolla, Calif., assignors to the United States of America as represented by the Secretary of the Navy Application June 28, 1944, Serial No. 542,504

5 Claims. (Cl. 35—10.4)

This invention relates to a training device and more particularly to one adapted for use in training crews of anti-submarine vessels.

Experience has shown that men are best trained when training conditions are made to simulate as nearly as possible the actual conditions under which the same actions will be performed in practice. Particularly is this true in warfare where, under the excitement and danger of action, training procedure is often forgotten.

The present invention is designed to provide training for crews of an anti-submarine vessel, by applying to the existing sound gear electrical signals which produce, through the gear, audible and visual information indicating the presence of a submarine target in the surrounding water. A target is thus simulated which, from the information supplied by the sound gear, resembles a real target. The simulated target may be made to appear to move, turn, stop, etc., and engage in evasive action, and the ship's crew must so conn the ship to find, follow and "destroy" the simulated target. The advantage of such training is that the ship's stations are actually manned by the crew, all equipment is operating, and the ship is actually conned by the crew in an attempt to maneuver it into a position, with respect to the target, for an attack.

Scoring mechanisms are also provided so that instead of dropping bombs or depth charges, electric scoring switches are actuated by means of which the instructor is enabled to determine whether the attack was successful.

An indicating mechanism is also included on which the positions of, and relative motion between, ship and target are shown. This is arranged to be visible to the instructor at all times and allows him to judge the progress of the attack at any instant.

And, additionally, controls are provided for the use of the instructor which enable him to adjust the course and speed of the simulated target in a realistic manner.

Thus, the present invention, provides training for crews in obtaining, evaluating and using information made available through the ship's sound gear. It accomplishes, in addition to the functions of the apparatus disclosed in a co-pending application entitled, "Attack Training Device," Serial No. 535,858, filed May 16, 1944, by Firth Pierce, George A. Brettell, Jr., Melvin O. Kappler and Clark F. Bradley, other desirable objects. The present gear may be operated in a manner that the simulated target is maneuvered in a much more realistic way; and continuous calculations of range, range rate, bearings, etc., need not be made. Nor is it necessary that the instructor utilize a specially designed slide rule, such as that disclosed in a co-pending application entitled, "Slide Rule," Serial No. 535,472, filed May 13, 1944, by Gaylord P. Harnwell, to make such calculations. The present invention does, however, make use of much of the electrical system of the device disclosed in the application first mentioned above, and is connected into the sound gear in substantially the same manner, so that the visual and audible information from the sound gear, and on which the simulated attack procedure is based, is the same.

Thus, in brief, the present system comprises a mechanical arrangement for automatically obtaining the values of and changes in speeds and bearings which may be used in conjunction with the electrical circuit of the application referred to above. At the outset, however, it should be noted that when the present invention is utilized, the bearing control circuit of that application may be eliminated.

In the drawings:

Fig. 1 is a schematic view of the mechanical arrangement of the invention.

Fig. 2 is an electrical schematic diagram of the contacts which control the echo delay time.

Fig. 3 is a detailed sectional view of one of the overtaking delay mechanisms.

Fig. 4 is a sectional view along the lines 4—4 of Fig. 3.

Figure 5 is an electrical schematic diagram of the circuit used in conjunction with the mechanism and circuits shown in Figures 1 through 4.

The present system comprises, in general, a pair of ball component solvers in which the North-South and East-West components of the motion of both a ship and a simulated target are obtained. In order that relative motion between ship and target is available, a pair of differentials is provided to obtain the differences between each of the respective components.

The output of each differential is applied separately to an indicating mechanism comprising two pairs of rollers, each pair of which supports a transparent curtain on which is marked a hairline. The two curtains are mounted at right angles to each other and the point of intersection of the hairlines (with respect to a fixed point) represents the position of the target with respect to the ship.

Additionally, there is an electrical control system, operating in a similar fashion, for supplying electrical quantities proportional to the various values of and changes in ranges and bearings.

The arrangement of the invention is illustrated schematically in Fig. 1. Quantities representing the speed of the ship and the target are obtained from the respective outputs of variable speed motors 1, 2. Since the training is conducted on a ship, the speed of motor 2 is varied to correspond to the ship's actual speed in the water. The speed of motor 1, representing the speed of the target, is varied by the instructor in a manner to represent the speed and changes in speed of an actual target.

The respective outputs of motors 1, 2 are resolved into North-South and East-West components in a pair of ball component solvers, generally designated 3, 4. Each of these solvers comprises a ball 5, which is engaged by and frictionally driven through an input roller 6 by the respective speed motor. The output components are taken off each ball 5 by a pair of output rollers 7, 8, as seen in Fig. 1, to provide the North-South and East-West components.

The directions of motion of the target and ship are established by means of a reversible, variable speed motor 9, and a conventional gyro-compass repeater 10, respectively. The motor 9 (or gyro-compass repeater) is utilized to drive a gear 11 which meshes with a second gear 12. The latter gear is fixed to input roller 6 on the ball solver and thus determines the direction of rotation of the ball 5 and consequently the magnitude of each of the output components, as determined by the rotation of rollers 7, 8.

Gyro-compass repeater 10 is of conventional type and it is obvious that the angular position of input roller 6 is simply arranged to follow the changes in direction of the ship as evidenced by the position of the repeater. It should also be noted that since motor 9 simulates turning, or change in direction of the simulated target, its rate of turning may be made to depend upon the speed of motor 1 in order that actual conditions are more perfectly represented, i. e., that the time required for executing a given maneuver is made dependent upon speed.

The difference between the North-South components of the ball solvers 3, 4 is obtained by applying the outputs of output rollers 7 to a differential 13, and the similar East-West difference component is obtained through the connection of output rollers 8 to differential 14.

The output of differential 13 is utilized to drive one of a pair of parallel rollers 15, 15 which mount a transparent curtain 16 on which is marked a hairline 17. The other of the pair of rollers 15 contains a pre-loaded spring arranged in such a manner that as the first roller is driven in one direction, the spring acts as a restraining force to maintain the curtain taut at all times. On the other hand, when the first roller is driven in the opposite direction, its driving force acts simply as a restraining force against the action of the pre-loaded spring contained in the second roller. This structure insures that the curtain 16 is held taut regardless of the direction of drive and, at the same time, provides means for absorbing all of the backlash components introduced by the gearing between the ball solver 5 and the indicating mechanism. Thus, as the rollers are rotated, the hairline 17 travels up and down, representing the North-South component of relative motion. In a similar way, the output of differential 14 controls a second pair of rollers 18, mounted at right angles to rollers 15. This pair of rollers also supports a transparent curtain 19 which carries a second hairline 20, whose motion simulates the East-West component of relative motion in the same manner.

Underneath the transparent curtains 16, 19 is a disk 21 mounted for rotation about its central reference point 22. It carries an arrow 23, representing the direction of motion of the ship, and is directly driven, through a gear 24, by the gyro-compass repeater 10. A fixed dial (not shown) in the form of an annulus may be mounted above the curtains on which the direction of the ship may be determined by the position of arrow 23. Disk 21 also may be provided with a suitable bearing and distance scale by means of which the range and bearing of the intersection of hairlines 17, 20, with respect to reference point 22 may be determined.

It is thus seen that the indicating mechanism provides information as to the direction of motion of the ship (arrow 23), the poistion of the ship (reference point 22), and the relative position and motion of the target with respect to the ship, as evidenced by the position of the intersection of hairlines 17, 20 with respect to reference point 22.

The indicating mechanism described above is for the use of the instructor in order that he may observe the procedure adopted in conning the ship as he alters the course and speed of the target by means of motors 9 and 1, respectively.

Since, however, the purpose of the invention is to train sound teams in attack procedures, an electrical control mechanism is also provided to obtain, in conjunction with the existing echo-ranging gear, visual and audible information simulating that which might be obtained if a real target were present and was executing similar maneuvers. In the application Serial No. 535,858, filed May 16, 1944, means are disclosed whereby signals are applied to existing echo-ranging equipment to simulate a target. For the present invention, the circuit illustrated in Fig. 4 of that application may well be used (with the bearing control circuit omitted). In place of the bearing control circuit the structure illustrated in Fig. 1 is substituted. This is shown schematically in Fig. 5. The outputs of differentials 13, 14, in addition to being applied to the indicating mechanism, are also applied to a pair of rods 25, 26, respectively, mounted to roll at right angles to each other on wheels 27, 28 and racks 29, 30, respectively. The two rods 25, 26 are slidably engaged by a block 31 whose motion is determined by the motion of the rods, and whose position, at any time, corresponds to the position of the intersection of hairlines 17, 20 on the indicating mechanism. Mounted below the block 31 and rods 25, 26 is a non-conducting circular disk 32. This disk is provided with a plurality of conducting inserts 33, insulated from one another and whose overall configuration represents the shape of the sound beam emanating from the sound projector. Disk 32 is designed to be rotated by means of a gear 34 which is directly driven by the output of a differential 35. The inputs applied to this differential are obtained from the gyro-compass repeater 10 and from a conventional repeater 36, actuated by the sound projector training mechanism, which indicates the relative bearing of the projector with respect to the ship. Thus, the output of differential 35 supplies orientation to disk 32 corresponding to true projector bearing. Thus, the plurality of inserts 33 maintains a direction corresponding to the direction at which the sound projector is trained.

Block 31 supports a contact 37 which slides over the surface of disk 32 in a manner that, when the disk and the block 31 are properly positioned with respect to one another, electrical contact is made between the contact 37 and one of the contact inserts 33. Positioned above the plane of motion of block 31 and directly above the center of disk 32 is a circular guide 38. A cord or wire 39 is attached to the upper surface of block 31 at a point directly above contact 37, and is brought through the guide 38, over a drum 40, and attached to the latter. An arm 41 is fixed to rotate with the drum 40 and its outer end carries the sliding contact 42 of a variable resistor 43, whose value at any time is measured across terminals A, A. Thus, since guide 38 is positioned at the center of disk 32 and represents the position of the ship and since the position of contact 37 represents the position of the target, the length of the cord 39 unwound off drum 40 is a measure of the distance between ship and target. If, then the variation in the value of resistor 43 is made linear with respect to changes in this distance, its value is a measure of range between ship and target.

Fig. 2 illustrates schematically the electrical connections between contact 37 on block 31 and the contact inserts 33 on disk 32. Individual leads connecting to the various contact inserts 33 may be brought off disk 32 by convenient means, such as slip rings, for connection to one side of terminals B, while the other side is connected to contact 37 on block 31. Since the configuration of the contact inserts, as a whole, represents the sound beam pattern, the individual resistors 44, connected in series with the respective inserts, are chosen of a value to attenuate any signal in an amount corresponding to their position in the simulated sound beam. Thus, progressing from the center of the disk 32 toward the edge, the inserts are associated with resistors of greater and greater value, to lessen the intensity of an echo obtained from correspondingly greater and greater ranges. Similarly, progressing outwardly in either direction from a radial line bisecting the simulated sound beam, the value of corresponding resistors increases to simulate the "off target" attenuation observed in actual practice.

When the present invention is used in conjunction with the electrical circuit of Fig. 4 in the application Serial No. 535,858, filed May 16, 1944, this circuit is modified in accordance with the present invention as illustrated in Figure 5 wherein elements also appearing in Figures 1 through 4 are assigned the same reference characters. Other elements disclosed in Figure 4 of the copending application are designated only generally in Figure 5, reference being had to the copending application for circuit details and operation.

It suffices to state herein that the generator 80 operates to develop a simulated echo signal which continuously supplies a push-pull output signal at the tapped secondary winding 81. This signal is applied to the grids of a pair of balanced modulator tubes 82 and 83 whose gain is affected by an amplitude control 84 acting as self-bias and governed by the control grid bias supplied by conductor 85. The plates of these tubes drive the output circuit including transformer 86 and attenuator 87. This output circuit is connected to supply the audio stages of the receiver 88 of the echo-ranging gear the output of which, in turn, is normally available in the loudspeaker 89.

The simulated echo is transmitted to the receiver 88 under control of the keying circuit which exercises control over modulator tubes 82 and 83 to produce echo simulation from an actual target. This is accomplished by applying a keying pulse by way of conductor 90 which is connected to the screen grids of tubes 82 and 83. No transmission results when the screen grids are negative with respect to the cathodes of the tubes and occurs when the potential on the screen grids approaches that of the plates of the tubes. The strength of the transmission is governed by the bias supplied by amplitude control 84 and conductor 85 as will become more fully apparent as the description proceeds.

The simulated echo signal must occur at the proper time after the outgoing signal or ping of the associated echo-ranging equipment, and further, must be of proper duration. In the standby condition, multivibrator tube 91 is conducting and multivibrator tube 92 is non-conducting with the result that potential on the plate of tube 91 which is applied to the screen grids of tubes 82 and 83 by way of conductor 90 is effective to cut off transmission of the simulated echo signal.

When a ping received from transmitter 93 and relay 94 is transmitted by sound projector 95, a short A. C. pulse which exists only during the period of the outgoing ping, operates relay 96. When the relay is thus energized, its normally open contacts 97 are closed to discharge condenser 98 and its normally closed contacts 99 are opened to extinguish tube 100. At the end of the ping the relay contacts are restored to their initial positions whereupon condenser 98 charges by way of tube 101 and potentiometers 43 and 102 and tube 100 fires, the time being controlled by the resistance values of potentiometers 43 and 102 and corresponding to the echo delay time found in sound gear operation.

The firing of tube 100 supplies a pulse to multivibrator tube 92 and renders it conducting and it, in turn, extinguishes multivibrator tube 91 whereupon the potential on conductor 90 is elevated at the screen grids of the modulator tubes 82 and 83 to cause transmission of the simulated echo which continues for a period controlled by the RC circuit including potentiometer 103 and condenser 104.

In the Bearing control circuit of Figure 4 of the aforesaid copending application, tube 27 and its plate load resistor constitute a variable resistor which is controlled by the input to the tube and which is replaced in the instant case by the particular resistance 44 whose contact 33 is engaged by contact 37. Thus, terminals B, B of Fig. 2 are connected between the center tap of the secondary output winding 81 and the +150 volt terminal on the power supply shown in that application. Since, as has been stated, the Bearing control section of that circuit is not used, the value of the particular resistor 44 connected in the circuit, determines the voltage applied to the center tap of winding 81 and thus determines the attenuation in the Output circuit corresponding to that observed at varying ranges and bearings.

Terminals A, A of the subject application are arranged to connect variable resistor 43 into the electrical circuit of the above mentioned application, in place of variable resistor 40 therein. Thus, the value of resistor 43 (whose value has been shown to be dependent on range) determines the delay time in the Keying circuit between "ping" and echo, as described in that application, in connection with resistor 40, therein.

Attenuator 13 shown in that application thus no longer is varied with range, but may conveniently be used as a gain control and an impedance matching device for the Output circuit.

The invention, as described above, is made more useful by the insertion of a plurality of memory devices 45, 46, 47, 48, 49 on the inputs of differentials 13, 14 and on the ship's course input of differentials 35. Their use may be best explained by understanding that in the ordinary attack upon a submarine, the underwater ordnance has a sinking time of several seconds, during which the target continues to move. Likewise, the ship continues to move, but its motions can no longer have any effect upon the incidence of bomb and target. If, then, it is desired to train crews in this phase of operation, the memory devices may be used.

Technically, these units might be more accurately termed "overtaking delay mechanisms," as they enable the driven element to be stopped for a pre-determined period and yet quickly restored to the position which it would have occupied had the delay not occurred. For example, as used here, means are provided for the student crew to actuate two of these mechanisms 45, 46 at a time at which depth bombs (or other ordnance) would ordinarily be dropped. The actuation of these mechanisms prevents the differentials from applying the components of ship motion to the indicating and electrical control mechanisms and only the target's motion is transmitted. In effect, the simulated ship is stopped for a period long enough for the simulated charges to sink, while the motion of the imaginary target continues. If, as can be determined from the indicating mechanism, the position of the target (as evidenced by the intersection of the hairlines) is within the lethal range of the charges after the sinking period has elapsed, the instructor may score the simulated target as "sunk." Since this scoring operation may take some little time, an additional set of memory or overtaking mechanisms 47, 48, operated by the instructor, is also included, in order that the target's motion may also be stopped during this period.

Since, however, it is desirable to continue the attack procedure, particularly if the tarket is not "sunk," the memory or overtaking mechanisms are arranged to be released by the instructor (after scoring) to bring the ship and simulated target to the relative positions which they would have occupied had the delay not been introduced. The attack may then be continued, as though no interruption had occurred.

So that this procedure may be even more accurately simulated, a similar overtaking mechanism 49 is included between the gyro-compass repeater 10 and differential 35, so that during the scoring period, changes in the ship's course do not affect the indicating mechanism. This unit, like units 47, 48 is under the control of the instructor.

One of the memory or overtaking devices illustrated schematically in Fig. 1, is shown in detail in Figs. 3 and 4. Each of these mechanisms is identical and they are used to restore the various elements to their original positions after the scoring operation has been completed.

In Fig. 3, the mechanism is seen to have a separate input shaft 51 and an output shaft 52 mounted in position by convenient supports 53, 53. A dish-shaped housing 54 is fixedly secured near the end of the input shaft 51 and a similar housing 55 is fixed to output shaft 52 in such a position that the open faces of the housings are opposed. Within the respective housings 54, 55 are a pair of pre-loaded, flat, spiral springs 56, 57, secured to the inner faces of their respective housings by means of pins 58, 59, respectively. The other and inner end of each of the springs 56, 57 is secured by means of pins 60, 61 to the opposite ends of a spool 62 positioned around shafts 51, 52. This spool is externally threaded between its flanges, as at 63, with right-hand threads extending over half this distance and left-hand threads extending over the remaining half.

Two nuts 64, 65 engage the threaded portion of the spool and are mounted, in their static positions, adjacent the flanges on spool 62. These nuts are provided with pins 66, 67, respectively, which are positioned to engage small offsets 68, 69, respectively, on the inner surfaces of the spool flanges. The pins and offsets overlie one another for a distance approximately equal to the pitch of the threads on spool 62 so that after one of the nuts makes one complete revolution with respect to the spool, its pin no longer engages the associated offset on the spool flange. The housings 54, 55 are also provided with another pair of pins 70, 71, respectively, which extend through the outer edges of the associated nuts 64, 65.

Associated with and as a component part of this mechanism is a magnetic brake mounted on the output side. The brake comprises a coil of wire 72 held in position around output shaft 52 by a magnetic housing 73 which, in turn, is secured to support 53 by any convenient means. Adjacent the brake housing is a magnetic plate 74 loosely secured to the back of housing 55 by an extension of pin 71 and an additional pin 75. Thus, when the brake housing 73 is magnetized, plate 74 is attracted to the magnetic brake housing 73 to lock housing 55 and nut 65.

Four operating conditions are to be considered: (1) input shaft rotating counterclockwise, brake not actuated; (2) input shaft rotating clockwise, brake not actuated; (3) input shaft rotating counterclockwise, brake actuated; and (4) input shaft rotating clockwise, brake actuated.

If the input shaft 51 is rotating counterclockwise with the brake not actuated, it will drive housing 54, which in turn drives nut 64 by means of pin 70. Spool 62 is directly driven by the rotation of nut 64 through the engagement of pin 66 with offset 68. On the output side, spool 62 drives housing 55 by virtue of the pre-load on spring 57, which, in turn, is secured to output shaft 52. Thus, in this case, the output shaft is driven at the same rotational speed as the input shaft.

In case 2, the same function is performed, although now housing 54 drives spool 62 through the pre-loaded spring 56. Spool 62, in turn, drives the housing 55 and output shaft 52 by means of the direct engagement of offset 69 with pin 67.

In case 3, where the brake is actuated and the input shaft is rotating counterclockwise, spool 62 is driven in the same manner as in case 1. Since, however, shaft 52, housing 55 and nut 65 are fixed by the operation of the brake, rotation of spool 62 simply stores energy in spring 57. Since, however, spool 62 is rotating and nut 65 is fixed, the spool threads through the nut 65 (as, after one turn, pin 67 and offset 69 will not engage) the same number of turns as are made by input shaft 51. Subsequently, when the brake is released, the energy stored in spring 57 is used to rotate housing 55 and output shaft 52 in the same number of turns as were made by input shaft 51. The rotation of housing 55 also restores nut 65, by means of pin 71, to its original position with respect to shaft 51.

In case 4, with clockwise rotation of the input shaft, while the brake is actuated, clockwise rotation of spool 62 is prevented by the offset 69 and pin 67. This causes nut 64 to progress along the threads on spool 62 (since after one turn, pin 66 and offset 68 no longer engage), and, at the same time, energy is stored in spring 56. When the brake is again released, the energy in spring 56 drives the output shaft 52 through spool 62, offset 69, pin 67, nut 65, pin 71 and housing 55, through the same number of turns as were made by input shaft 51 while the brake was actuated.

It should be noted that the action of the memory or overtaking mechanism is limited only by the distance that nut 64 (or nut 65) may progress along the threads on spool 62 before the adjacent ends of pins 66, 67 engage each other. It should further be noted that in Fig. 4, the spring 57 is schematically illustrated and has, in actual fact, many more turns than are illustrated.

The electrical operation of one of the magnetic brakes is illustrated in Fig. 3. The coil 72 is energized by current from battery 76, when the circuit is closed by means of key 77. As described above, one such circuit, with the coils in series, may be used by the instructor to actuate overtaking mechanisms 47, 48, 49 and a similar circuit may be used by the student crew to actuate units 45, 46. Conventional relays may be provided in order that the instructor may release both of the keys at once at the end of the scoring in order that the driven shafts may be restored to the position they would have occupied had the magnetic brakes not been applied.

In operation, connections are made to the electrical circuit at terminals A, A and B, B, as described above. The associated echo-ranging gear is put into operation and the speed of motor 2 is set to correspond to the ship's speed, subsequent and corresponding changes in which may be made automatically or manually. The North-South and East-West components of this motion, whose respective magnitudes are determined by the heading of the ship as controlled by the gyro-compass repeater 10, are obtained from the ball solver 4 and applied to differentials 13, 14, respectively. The speed and course of the simulated target are controlled by the instructor by means of motors 1, 9, respectively. Ball solver 3 likewise supplies the north-south and east-west components of this simulated target motion to the differentials 13, 14. The difference components (or the components of relative motion between ship and simulated target) are directly applied to the driven rollers 15, 18. Operation of the curtains 16, 19 and the intersecting hairlines 17, 20, by means of such rollers, effectively portrays the relative motion of the target with respect to the ship (fixed point 22). The instructor has before him the indicating mechanism on the plotting table with the indicating mechanism showing the position of the simulated target and bearing of the position. The crew being trained is not permitted to see this bearing or position indicator, nor the electrical control mechanism which is also a part of the plotting table. The crew is at stations operating the sound gear of the ship, on which is signaled the simulated target noise as heretofore described.

Thus, as the ship is conned, the instructor is enabled to observe the progress of its maneuvers as the student crew attempts to bring it into a position for the attack on the simulated target. Not only is he enabled to judge the relative positions, but the direction indicated by arrow 23 tells him, at all times, the direction in which the students are heading the ship. Additionally, by operating the controls on target motors 1, 9, he may cause the simulated target to take evasive action, as might be true in actual practice.

The student crew is, during the simulated attack (in which the ship actually maneuvers), conning the ship on the basis of the audible and visual information made available at the sound gear. Block 31 (on the electrical control mechanism) is, as has been described, at the same position with respect to the ship (represented by the center of disk 32) as is the simulated target. If the students train the sound projector toward the target, disk 32 occupies a position (determined by the output of differential 35) such that the output circuit is closed by means of contact 37 and one of contact inserts 33. An echo signal will thus be introduced into the echo-ranging gear, as described in the application mentioned above. The proper delay between the keying "ping" and the echo, which is obviously a measure of range, is determined in the keying circuit as controlled by the setting of variable resistor 43. Its value, in turn, is dependent upon the angular position of drum 40 as a measure of the distance between contact 37 (simulated target) and the center of disk 32 (ship).

The variation in echo strength observed with varying ranges is obtained, as has been described, by the different values of resistors 44 (associated with insert contacts 33) which attenuate the signal applied to the output circuit more and more, as the range increases. In a similar manner, this signal is attenuated more and more as contact 37 moves away from the center line of the configuration of contact inserts 33 (corresponding to training of the projector away from the target's bearing), until the circuit is broken. Obviously no echo is heard during the periods in which contact 37 touches only the non-conducting portions of disk 32, as such positioning indicates that the sound projector is not being trained in the direction of the target.

In order to illustrate the scoring procedure, assume that the student crew has maneuvered the ship to a point at which it considers that depth charges should be dropped. Instead of actually doing so, the crew will actuate the key 77 which with battery 76 controls the overtaking mechanisms 45, 46. This prevents rotation of the output shafts, and as a consequence, the only components of motion applied to move hairlines 17, 20 and block 31 are those of the simulated target. Thus, the indicating mechanism, during this period portrays the motion of the target (the intersection of the hairlines) with respect to the point where the charges were dropped by the ship (reference point 22). After the sinking time has elapsed, the instructor operates another key 79 acting with another battery 78 to lock the magnetic brakes on overtaking mechanisms 47, 48, 49, which operation fixes the simulated target position (the intersection of the hairlines) with respect to the point of explosion of the charges (reference point 22). By measuring the distance between these points, the instructor is enabled to determine whether or not the target was within the lethal range of the charge or charges. When scoring is completed, the instructor may release all of the magnetic brakes and restore the hairlines and block 31 to the positions they would have occupied had the brakes not been actuated.

In connection with the use of these mechanisms, it is to be noted that any conventional delay mechanism may be utilized to automatically actuate the target overtaking mechanisms 47, 48, 49 at any pre-determined (sinking) time after the ship mechanisms 45, 46 have been operated. It should also be noted that the overtaking mechanisms may be arranged to be effective only on the motions portrayed on the indicating mechanism, in order that even during sinking and scoring time, the electrical control mechanism may be affected by continuing motion of ship and target, and, as a conesquence, continues to supply correct signals to the sound gear. Such an arrangement, however, requires more differentials and its advantages are largely overcome by the fact that during an actual attack, the sound gear provides very little information for a considerable period after the explosion of depth charges.

Having described our invention, we claim:

1. In a device for training students in the use of shipboard mounted underwater sound echo-ranging gear, said gear including a transmitter, a receiver and an underwater sound projector, the combination comprising; a rotatable plotting table having a mark thereon constituting a reference point representing the position of said ship, a contact member, means mounting said contact member for independent motions along at least two orthogonal coordinates, means for separately applying the components of motion between said ship and a simulated moving target to drive said contact member, a plurality of conductive inserts arranged in a pattern corresponding to the lobe pattern of the underwater pulse emitted from said projector, means mounting said insert pattern for rotation about said point as a center, and means for maintaining said insert pattern in a direction corresponding to the direction in which the sound projector is trained whereby contact will be made between said contact member and one of said conductive inserts when said sound projector is trained in a direction corresponding to the position which said contact member occupies relative to said reference point.

2. In a device for training students in the use of shipboard mounted underwater sound echo-ranging gear, said gear including a transmitter, a receiver and an underwater sound projector, and in which signal pulses of supersonic frequency from said transmitter emitted by said projector are echoed back thereto from a target for detection in said receiver, the combination comprising; means for generating signal pulses corresponding to pulses emitted by said projector, circuit means for applying said generated pulses to said receiver subsequent to pulse emission to simulate a pulse echo from an actual target, and a switching device connected in said circuit means for preventing application of said generated pulses except when said projector is trained in a direction corresponding to the direction of the simulated target relative to said ship, said switching device comprising; a rotatable plotting table having a mark thereon constituting a reference point representing the position of said ship, a first switch contact member, means mounting said contact member for independent motions along at least two orthogonal coordinates, means for separately applying the components of motion between said ship and the simulated target to drive said contact member, a plurality of conductive inserts arranged in a pattern corresponding to the lobe pattern of the pulse emitted by said projector with each insert constituting a second switch contact member, means mounting said insert pattern for rotation about said point as a center, and means for maintaining said insert pattern in the direction in which said sound projector is trained whereby contact between said first contact member and one of said second contact members will be established only when said sound projector is trained in a direction corresponding to the position which said first contact member occupies relative to said reference point.

3. Apparatus for shipboard training with echo-ranging equipment comprising a rotatable table having a point thereon and a line through said point representing respectively the position of a ship and its heading, means responsive to the heading of said ship for rotating said table, a pair of movable transparent curtains positioned over said table, said curtains each having a line at right angles to each other, separate means for moving each of said curtains in a path normal to the line on each, said moving means being responsive to components of relative motion between the ship and a simulated target whereby said curtains and the lines thereon are moved in accordance with said components.

4. Apparatus for shipboard training with echo-ranging equipment comprising a directional signal projector, means generating components indicative of ship and simulated target position, a rotatable disc having a plurality of contacts thereon arranged in a pattern corresponding to the lobe pattern of said projector, means responsive to the bearing of said projector for rotating said disc, a movable member, means responsive to said components for moving said member, an electrical circuit including a contact on said member adapted to close said circuit through one of said plurality of contacts when juxtapositioned therewith, a guide positioned centrally on said disc, a rotary potentiometer, and an elongated element connected to said member and said potentiometer and extending through said guide for adjusting said potentiometer in accordance with the position of said member.

5. Apparatus for shipboard training with echo-ranging equipment comprising a directional signal projector, means generating components indicative of ship and simulated target positions, a rotatable disc having a plurality of contacts thereon arranged in a pattern corresponding to the lobe pattern of said projector, means responsive to the bearing of said projector, a movable member, means responsive to said components for moving said member, an electrical circuit including a contact on said member adapted to close said circuit through one of said plurality of contacts on said disc when juxtapositioned therewith, a guide positioned centrally on said disc, a rotary potentiometer, an elongated element connected to said member and said potentiometer and extending through said guide for adjusting said potentiometer in accordance with the position of said member, means for generating a signal including said electrical circuit for attenuating said signal, and means for pulsing said signal including said potentiometer which controls the delay of the pulse.

References Cited in the file of this patent

UNITED STATES PATENTS

| Number | Name | Date |
|---|---|---|
| 1,391,652 | Meitner | Sept. 20, 1921 |
| 1,701,582 | Mengden | Feb. 12, 1929 |
| 1,785,241 | Bates | Dec. 16, 1930 |
| 1,985,265 | Smith | Dec. 25, 1934 |
| 1,985,266 | Smith et al. | Dec. 25, 1934 |
| 2,109,283 | Boykow | Feb. 22, 1938 |
| 2,149,440 | Jackson | Mar. 7, 1939 |
| 2,321,799 | Cone | June 15, 1943 |
| 2,360,361 | Mountbatten | Oct. 17, 1944 |
| 2,402,088 | Ross | June 11, 1946 |